(12) United States Patent  
Mironenko

(10) Patent No.: US 9,391,782 B1  
(45) Date of Patent: Jul. 12, 2016

(54) VALIDATION OF USER CREDENTIALS

(71) Applicant: MicroStrategy Incorporated, Vienna, VA (US)

(72) Inventor: Sergey Mironenko, Ellicott City, MD (US)

(73) Assignee: MicroStrategy Incorporated, Vienna, VA (US)

( * ) Notice: Subject to any disclaimer, the term of this patent is extended or adjusted under 35 U.S.C. 154(b) by 161 days.

(21) Appl. No.: 14/208,024

(22) Filed: Mar. 13, 2014

Related U.S. Application Data

(60) Provisional application No. 61/785,455, filed on Mar. 14, 2013.

(51) Int. Cl.
  *H04L 29/06* (2006.01)
  *H04L 9/32* (2006.01)

(52) U.S. Cl.
  CPC ............ *H04L 9/3247* (2013.01); *H04L 9/3249* (2013.01); *H04L 9/3252* (2013.01)

(58) Field of Classification Search
  CPC ... H04L 9/3252; H04L 9/3247; H04L 9/3249; H04L 9/32
  See application file for complete search history.

(56) References Cited

U.S. PATENT DOCUMENTS

| | | | | | |
|---|---|---|---|---|---|
| 2006/0156391 | A1* | 7/2006 | Salowey | ............. | H04L 63/0823 726/5 |
| 2007/0234042 | A1* | 10/2007 | Gantman | ............. | H04L 63/083 713/156 |
| 2011/0096196 | A1* | 4/2011 | Lee | ...................... | H04N 19/625 348/231.3 |
| 2011/0099117 | A1* | 4/2011 | Schepers | ............... | G06F 21/305 705/318 |
| 2011/0219427 | A1* | 9/2011 | Hito | ........................ | G06F 21/00 726/3 |
| 2012/0210124 | A1* | 8/2012 | Lieber | ................... | H04L 9/0825 713/158 |
| 2013/0031623 | A1* | 1/2013 | Sanders | .................. | G06F 21/34 726/19 |
| 2013/0078733 | A1* | 3/2013 | Holmes | ................. | B01L 3/0217 436/174 |
| 2013/0346742 | A1* | 12/2013 | Tada | .................... | H04L 63/0823 713/155 |

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wild/Certificate_authority>, 4 pages.

(Continued)

*Primary Examiner* — Chau Le
*Assistant Examiner* — Ghodrat Jamshidi
(74) *Attorney, Agent, or Firm* — Fish & Richardson P.C.

(57) ABSTRACT

In one implementation, a client device obtains data associated with a credential. The client device then obtains a first version of a representation for the credential and a second version of the representation for the credential, the first version being configured for validation by a validation entity via concurrent network communication, and the second version being configured for validation by a validation entity without concurrent network communication, wherein the second version of the credential comprises a digital signature derived from a private key of a credential grantor and a portion of the data associated with the credential. The client device receives a request to output a representation for the credential. Then the client device outputs the second version of the representation for the credential in a manner that enables a validation entity to validate the credential by accessing a public key of the credential grantor to authenticate the digital signature.

19 Claims, 7 Drawing Sheets

(56) References Cited

OTHER PUBLICATIONS

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wild/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wild/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wild/Public_Key_Infrastructure>, 6 pages.

Wikipedia, "SecurID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

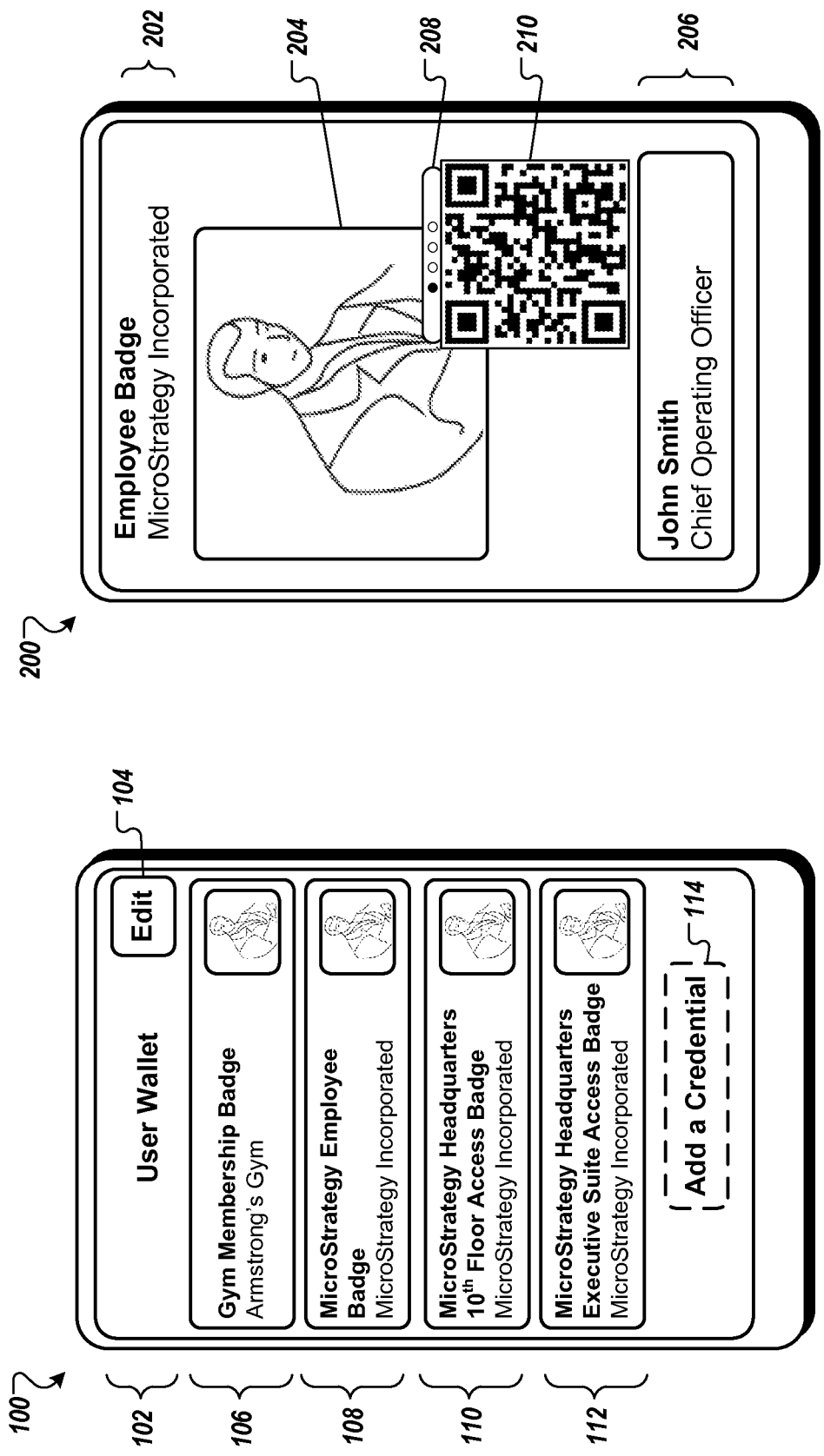

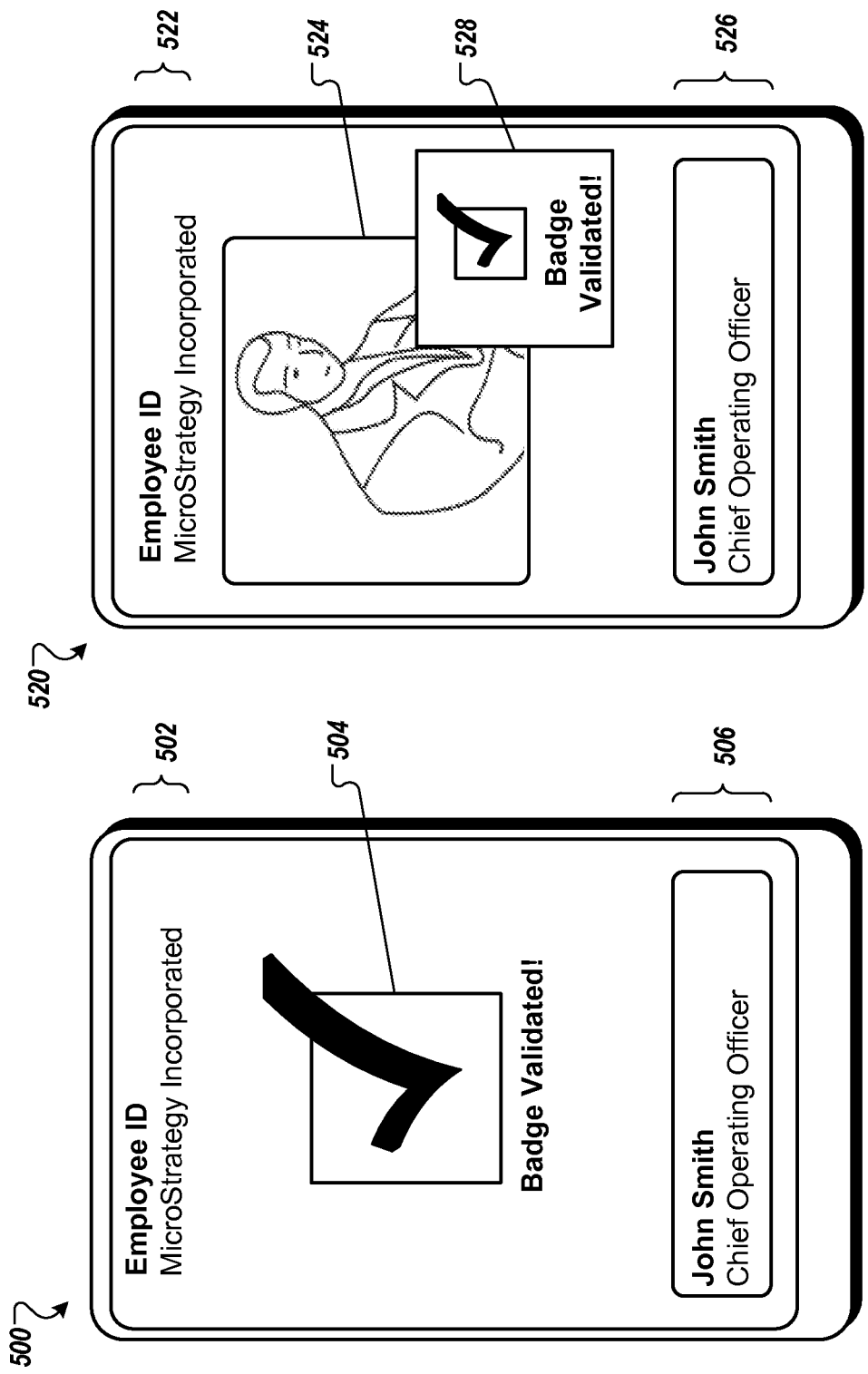

US 9,391,782 B1

VALIDATION OF USER CREDENTIALS

CROSS-REFERENCE TO RELATED APPLICATION

This application claims priority from U.S. Provisional Application No. 61/785,455, filed Mar. 14, 2013, and titled "Validation of User Credentials," which is incorporated by reference.

TECHNICAL FIELD

This specification generally relates to user credentials.

BACKGROUND

A person may be associated with a credential that, for example, permits the person to access locations and/or events.

SUMMARY

In general, one aspect of the subject matter described in this specification may include a client device obtaining data associated with a credential. The client device obtaining a first version of a representation for the credential and a second version of the representation for the credential, where the first version is configured for validation by a validation entity via concurrent network communication, and the second version is configured for validation by a validation entity without concurrent network communication, and the second version of the credential also includes a digital signature derived from a private key of a credential grantor and a portion of the data associated with the credential. The client device receiving a request to output a representation for the credential. And, the client device outputting the second version of the representation for the credential by the client device in a manner that enables a validation entity to validate the credential by accessing a public key of the credential grantor to authenticate the digital signature.

Implementations can include one or more of the following features. For example, the client device obtaining data associated with a credential may include the client device obtaining one or more of a credential identifier, a user identifier, a user name, a credential grantor identifier, a badge type, a user email address, a user phone number, and a user physical address. The client device also may determine that the client device lacks network connectivity, and outputting the second version of the representation for the credential in a manner that enables a validation entity to validate the credential by accessing a public key of the credential grantor to authenticate the digital signature may include automatically outputting, in response to determining that the client device lacks network connectivity, the representation for the second version of the credential in a manner that enables a validation entity to validate the credential by accessing a public key of the credential grantor to authenticate the digital signature.

The client device obtaining data associated with a credential may include the client device obtaining a version identifier of the public key, and outputting the second version of the representation for the credential in a manner that enables a validation entity to validate the credential by accessing a public key of the credential grantor to authenticate the digital signature may include outputting the representation for the second version of the credential in a manner that enables a validation entity to validate the credential by accessing a public key of the credential grantor based on the version identifier to authenticate the digital signature.

The client device obtaining a first version of a representation for the credential and a second version of the representation for the credential, where the first version is configured for validation by a validation entity via concurrent network communication, and the second version is configured for validation by a validation entity without concurrent network communication, with the second version of the credential including a digital signature derived from a private key of a credential grantor and at least a portion of the data associated with the credential may include the client device obtaining a first optical-machine readable representation for the credential and a second optical machine-readable representation for the credential, where the first optical machine-readable representation is configured for validation by a validation entity via concurrent network communication, and the second optical machine-readable representation is configured for validation by a validation entity without concurrent network communication, and the second optical machine-readable representation may include a digital signature derived from a private key of a credential grantor and at least a portion of the data associated with the credential. Additionally, the client device receiving a request to output a representation for the credential may include the client device receiving a request to output an optical machine-readable representation, and outputting the second version of the representation for the credential in a manner that enables a validation entity to validate the credential by accessing a public key of the credential grantor to authenticate the digital signature may include outputting the second optical machine-readable representation to a display of the client device in a manner that enables a validation entity to validate the credential by accessing a public key of the credential grantor to authenticate the digital signature.

The client device obtaining a first version of a representation for the credential and a second version of the representation for the credential, where the first version is configured for validation by a validation entity via concurrent network communication, and the second version is configured for validation by a validation entity without concurrent network communication, and the second version of the credential includes a digital signature derived from a private key of a credential grantor and at least a portion of the data associated with the credential may include the client device obtaining a first quick response (QR) code representing the credential and a second QR code representing the credential, where the first QR code is configured for validation by a validation entity via concurrent network communication, and the second QR code is configured for validation by a validation entity without concurrent network communication, and where the second QR code includes a digital signature derived from a private key of a credential grantor and at least a portion of the data associated with the credential. Additionally, the client device receiving a request to output a representation for the credential may include the client device receiving a request to output a QR code, and outputting the second version of the representation for the credential in a manner that enables a validation entity to validate the credential by accessing a public key of the credential grantor to authenticate the digital signature may include outputting the second QR code representing the credential to a display of the client device in a manner that enables a validation entity to validate the credential by accessing a public key of the credential grantor to authenticate the digital signature.

The client device obtaining a first version of a representation for the credential and a second version of the representation for the credential, where the first version is configured for validation by a validation entity via concurrent network communication, and the second version is configured for validation by a validation entity without concurrent network communication, and where the second version of the credential includes a digital signature derived from a private key of a credential grantor and at least a portion of the data associated with the credential may include the client device obtaining a first optical-machine readable representation for the credential and a sequence of optical machine-readable representations for the credential, where the first optical machine-readable representation is configured for validation by a validation entity via concurrent network communication, and the sequence of optical machine-readable representations is configured for validation by a validation entity without concurrent network communication, and where at least one of the optical machine-readable representations in the sequence of optical machine-readable representations includes a digital signature derived from a private key of a credential grantor and at least a portion of the data associated with the credential. Additionally, the client device receiving a request to output a representation for the credential may include the client device receiving a request to output an optical machine-readable representation, and outputting the second version of the representation for the credential in a manner that enables a validation entity to validate the credential by accessing a public key of the credential grantor to authenticate the digital signature may include outputting the sequence of optical machine-readable representations to a display of the client device in a manner that enables a validation entity to validate the credential by accessing a public key of the credential grantor to authenticate the digital signature.

The client device obtaining a first version of a representation for the credential and a second version of the representation for the credential, where the first version is configured for validation by a validation entity via concurrent network communication, and the second version is configured for validation by a validation entity without concurrent network communication, and where the second version of the credential includes a digital signature derived from a private key of a credential grantor and at least a portion of the data associated with the credential may include the client device obtaining a first near-field communications (NFC) signal representing the credential and a second NFC signal representing the credential, where the first NFC signal is configured for validation by a validation entity via concurrent network communication, and the second NFC signal is configured for validation by a validation entity without concurrent network communication, and where the second NFC signal includes a digital signature derived from a private key of a credential grantor and at least a portion of the data associated with the credential. Additionally, the client device receiving a request to output a representation for the credential may include the client device receiving a request to output an NFC signal representing the credential, and outputting the second version of the representation for the credential in a manner that enables a validation entity to validate the credential by accessing a public key of the credential grantor to authenticate the digital signature may include outputting the second NFC signal in a manner that enables a validation entity to validate the credential by accessing a public key of the credential grantor to authenticate the digital signature.

The client device obtaining a first version of a representation for the credential and a second version of the representation for the credential, where the first version is configured for validation by a validation entity via concurrent network communication, and the second version is configured for validation by a validation entity without concurrent network communication, and where the second version of the credential includes a digital signature derived from a private key of a credential grantor and a portion of the data associated with the credential may include the client device obtaining a first version of a representation for the credential and a second version of the representation for the credential, where the first version is configured for validation by a validation entity via concurrent network communication, and the second version is configured for validation by a validation entity without concurrent network communication, and where the second version of the credential includes a digital signature derived using one of a Rivest Shamir Adleman (RSA) algorithm or a digital signature algorithm (DSA) to encode a private key of a credential grantor and a portion of the data associated with the credential. Additionally, the client device outputting the second version of the representation for the credential in a manner that enables a validation entity to validate the credential by accessing a public key of the credential grantor to authenticate the digital signature may include the client device outputting the second version of the representation for the credential in a manner that enables a validation entity to validate the credential by using the RSA algorithm or the DSA with a public key of the credential grantor to authenticate the digital signature.\

The client device also may delete the second version of the representation for the credential after a predetermined period of time. The client device also may receive a notification that the second version of the representation for the credential has been revoked, and may delete the second version of the representation for the credential in response to the notification.

The client device obtaining a first version of a representation for the credential and a second version of the representation for the credential, where the first version is configured for validation by a validation entity via concurrent network communication, and the second version is configured for validation by a validation entity without concurrent network communication, and where the second version of the credential includes a digital signature derived from a private key of a credential grantor and a portion of the data associated with the credential may include the client device obtaining a first version of a representation for the credential and a second version of the representation for the credential, where the first version is configured for validation by a validation entity via concurrent network communication, and the second version is configured for validation by a validation entity without concurrent network communication, and where the second version of the credential includes a user name, a user title, a credential grantor identifier, and a digital signature derived from a private key of a credential grantor and a portion of the data associated with the credential. Additionally, the client device outputting the second version of the representation for the credential in a manner that enables a validation entity to validate the credential by accessing a public key of the credential grantor to authenticate the digital signature may include the client device outputting the second version of the representation for the credential in a manner that enables a validation entity to validate the credential by accessing a public key of the credential grantor to authenticate the digital signature, and to decode the user name, the user title, and the credential grantor identifier from the second version such that the validation entity can output the username, the user title, and the credential grantor to a display of the validation entity.

Another aspect of the subject matter described in this specification may include a processing system associated with a validation entity receiving a representation for a credential from a client device. The processing system associated with a validation entity decoding the representation to generate data associated with the credential. The processing system associated with a validation entity determining that the data associated with the credential includes a digital signature derived from a private key of a credential grantor and a portion of the data associated with the credential. The processing system associated with a validation entity accessing a public key of the credential grantor without concurrent network communication. And, the processing system associated with a validation entity validating the credential by authenticating the digital signature using the public key of the credential grantor and the portion of the data associated with the credential.

Implementations can include one or more of the following features. For example, the processing system may receive data identifying a set of credentials that have been revoked, compare the credential to each credential in the set of credentials that have been revoked, and determine that the credential has not been revoked based on the comparison.

The processing system may determine that the processing system lacks network connectivity, store information identifying the validated credential as a consequence of having determined that the processing system lacks network connectivity, and after determining that network connectivity has been regained, communicate the information identifying the validated credential to a server.

The processing system decoding the representation to generate data associated with the credential may include the processing system decoding the representation to obtain one or more of a credential identifier, a user identifier, a user name, a credential grantor identifier, a badge type, a user email address, a user phone number, and a user physical address.

The processing system decoding the representation to generate data associated with the credential may include the processing system decoding the representation to obtain a user name, a user title, and a credential grantor identifier, and the processing system may output a display of the credential having the user name, the user title, and the credential grantor identifier in response to validating the credential, such that the display of the credential at the processing system is substantially similar to a display of the credential at the client device.

The processing system decoding the representation to generate data associated with the credential may include the processing system decoding the representation to obtain a version identifier of the public key, and accessing a public key of the credential grantor without concurrent network communication may include, accessing a public key of the credential grantor based on the version identifier without concurrent network communication.

The processing system determining that the data associated with the credential includes a digital signature derived from a private key of a credential grantor and a portion of the data associated with the credential may include the processing system determining that the data associated with the credential includes a digital signature derived using one of a Rivest Shamir Adleman (RSA) algorithm or a digital signature algorithm (DSA) to encode a private key of a credential grantor and a portion of the data associated with the credential, and validating the credential by authenticating the digital signature using the public key of the credential grantor and the portion of the data associated with the credential may include validating the credential by using the RSA algorithm or the DSA with the public key of the credential grantor and the portion of the data associated with the credential to authenticate the digital signature.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 1 is an illustration of an example of a user interface that enables a user to select from among various credentials.

FIG. 2 is an illustration of an example of a user interface including an optical-machine readable representation of a credential configured for validation with concurrent network communication.

FIGS. 5A and 5B are illustrations of example screens notifying a validation entity that a credential has been validated.

DETAILED DESCRIPTION

Figure 4:
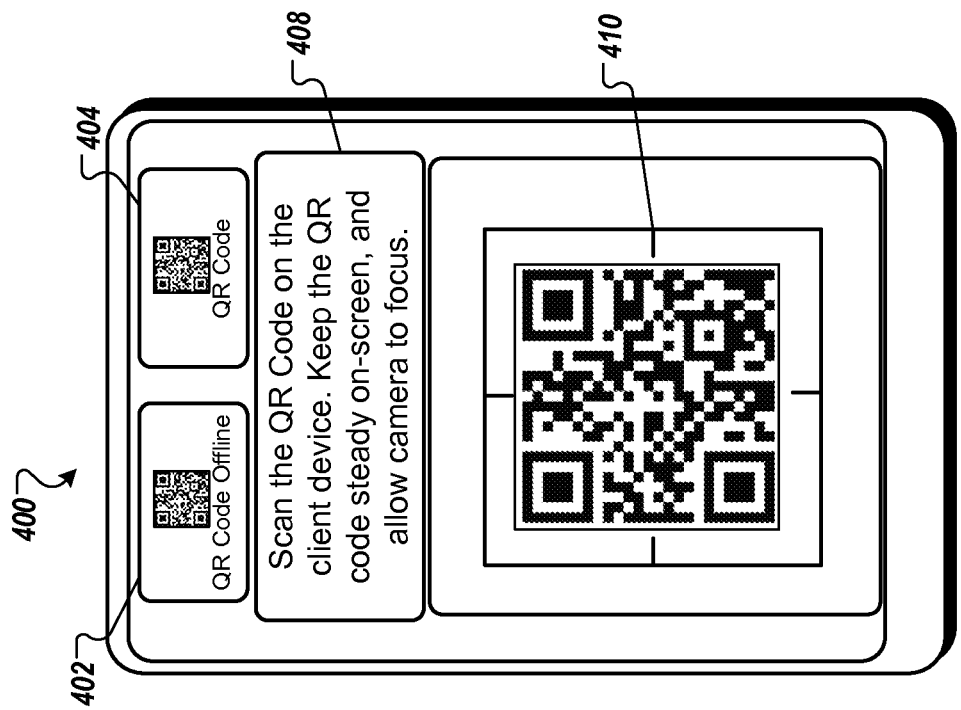
FIG. 4 is an illustration of an example user interface for validating an optical machine-readable representation for a credential.

In some instances, representations of credentials for groups of users or individuals are generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., on a door), etc.

A credential management application executing on one or more servers may provide a network through which multiple different credential-issuing organizations can distribute and manage (e.g., validate, revoke, etc.) credentials issued by the credential-issuing organizations. After a credential-issuing organization has issued a credential to a user through the credential management application, a credential management application server may use a private key of the credential-issuing organization held in escrow by the credential management application to digitally sign a representation of the credential before transmitting the representation of the credential to the user's client device. A validating device (e.g., a processing system operated by a validation entity) may then be able to validate this credential without concurrent network communication (e.g., when the validating device is off-line or otherwise without network connectivity). In particular, a validating device may be able to validate this credential by using a public key of the credential-issuing organization to authenticate the digital signature applied to the representation of the credential. As described herein, validating credentials without concurrent network communication may refer to off-line validation that does not require communication with another computing device after the representation of the credential to be validated has been received to perform the validation. However, the validating device may conduct network communication before and/or after validation has been completed.

Examples of different representations for credentials and mechanisms for validating the different representations will now be described. In certain implementations, credentials can be represented by optical machine-readable representations, sound signals, and/or near-field communication (NFC) signals.

A first form of representation for a credential is an optical machine-readable representation. As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a quick response (QR) code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data (e.g., the user name, user title, and/or credential grantor associated with the credential). In other implementations, optical machine-readable representations of credentials may encode other identifiers that are linked to or otherwise associated with credential identifiers.

To generate an optical machine-readable representation, a client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, a client device may output an optical machine-readable representation to a display of the client device. A validating device (e.g., a processing system operated by a validation entity) can scan the portion of the client device's display showing the representation of the credential and decode the representation of the credential to generate a set of alphanumeric characters that were encoded in the representation of the credential. In particular, the validating device may output a reticle defining a field of view from a camera operatively coupled to the validating device. This reticle can be used to scan the optical machine-readable representation of the credential from the relevant portion of the client device's display.

The validating device may use any suitable mechanism to decode the optical machine-readable representation of the credential. For example, the validating device may access a function or library routine that captures and decodes QR codes and/or barcodes using a camera operatively coupled to the validating device. Suitable libraries may include, for example, Red Laser or Zxing.

As described in more detail below, a validating device may validate a set of alphanumeric characters from an optical machine-readable representation without concurrent network communication. For example, the optical machine-readable representation for the credential may include a digital signature generated using a digital signature algorithm that generates the digital signature based on data derived from the credential and a private key of the credential grantor. The validating device may then access a public key of the credential grantor to validate the digital signature using the digital signature algorithm. Upon successful validation, the validating device may output a display providing information from the validated credential such as the user name, user title, and/or credential grantor associated with the credential.

Alternatively or in addition, the validating device may validate the optical machine-readable representation of the credential by transmitting a validation request message to a server. The validation request message may include data corresponding to the alphanumeric characters that were encoded in the optical machine-readable representation of the credential. When the server receives the validation request message, it attempts to confirm that the presented representation of the credential is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential. Upon successful validation, the server sends the validating device a validation response indicating that the representation for the credential was valid (e.g., the alphanumeric characters in the request match a valid sequence of alphanumeric characters for the credential). In turn, the validating device may then provide an indication that the representation presented by the user was valid.

In addition to validating the optical machine-readable representation of the credential, the server also may validate the integrity of the data encoded within the optical machine-readable representation of the credential. For example, the optical machine-readable representation of the credential may include a time sensitive checksum to prevent misrepresentations of other users' credentials. In such cases, the alphanumeric characters encoded in the optical machine-readable representation of the credential include both the credential and the time sensitive checksum. The server can then validate the alphanumeric characters encoding the credential in the optical machine-readable representation of the credential using the time sensitive checksum, thereby safeguarding the data integrity of the user's credential.

In some implementations involving QR codes, an animated QR code (e.g., a display of a sequence of different QR codes) may be used for the off-line version of a representation for a credential. Such an animated QR code may enable more information to be communicated to the validating device than is capable of being encoded in a single QR code. Additionally, an animated QR code may allow relatively low resolution QR codes to be used to communicate the information to the validating device. Consequently, animated QR codes may mitigate difficulties in displaying high-resolution QR codes and/or accurately scanning QR codes displayed on glass displays held unsteadily in users' hands.

Another form of representation for a credential is a sound signal. As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

A sound signal representing a credential may encode data including or representing a corresponding credential identifier and any other suitable data (e.g., the user name, user title, and/or credential grantor associated with the credential). In addition, a sound signal representing a credential may encode another identifier that is linked to or otherwise associated with a corresponding credential identifier. In some implementations, a given sound signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate a sound signal, a client device may use any suitable technique for encoding a representation of a credential. For example, the client device may call a function or library routine that encodes data into sound signals such as the Zoosh software development kit (SDK) by Naratte, Inc. The client device can then output the sound signal representation of the credential from a speaker coupled to the client device for reception by a validating device.

To initiate the validation process for a sound signal, a client device outputs a sound signal representing a credential (e.g., using a speaker). A validating device may then receive the sound signal at a microphone of the validating device and decode the sound signal representation of the credential to generate a set of alphanumeric characters that were encoded in the sound signal. The validating device may use any suitable mechanism to receive and decode the sound signal.

As described in more detail below, a validating device may validate a set of alphanumeric characters from a sound signal without concurrent network communication. For example, the sound signal may include a digital signature generated using a digital signature algorithm that generates the digital signature based on data derived from the credential and a private key of the credential grantor. The validating device may then access a public key of the credential grantor to validate the digital signature using the digital signature algorithm. Upon successful validation, the validating device may output a display providing information from the validated credential such as the user name, user title, and/or credential grantor associated with the credential.

Alternatively or in addition, the validating device may validate the sound signal by transmitting a validation request message to a server. The validation request message may include data corresponding to the alphanumeric characters that were encoded in the sound signal. When the server receives the validation request message, it attempts to confirm that the presented sound signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential. Upon successful validation, the server sends the validating device a validation response indicating that the sound signal was valid (e.g., the alphanumeric characters in the request match a valid sequence of alphanumeric characters for the credential). In turn, the validating device may then provide an indication that the representation presented by the user was valid.

In addition to validating the credential encoded within the sound signal, the server also may validate the integrity of the data encoded within the sound signal. For example, the sound signal may include a time sensitive checksum to prevent misrepresentations of other users' credentials. In such cases, the alphanumeric characters encoded in the sound signal include both the credential and the time sensitive checksum. The server can then validate the alphanumeric characters encoding the credential in the sound signal using the time sensitive checksum, thereby safeguarding the data integrity of the user's credential.

Still another form of representation for a credential is a near field communication (NFC) signal. NFC as described herein may include a set of standards (e.g., ECMA-340 and ISO/IEC 18092) for client devices to establish radio communication with each other by touching them together or bringing them into close proximity (e.g., within a few centimeters). NFC as described herein may also include other suitable short range wireless communication protocols such as Bluetooth or Zigbee.

A client device may use any suitable technique for encoding a representation of a credential within an NFC signal, such as a function or library routine. An NFC signal representing a credential may encode data including or representing a corresponding credential identifier and any other suitable data (e.g., the user name, user title, and/or credential grantor associated with the credential). In addition, an NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To initiate the validation process for an NFC signal, a client device transmits an NFC signal representing a credential. A validating device may then receive the signal at a receiver of the validating device and decode the NFC signal representing the credential to generate the set of alphanumeric characters encoded in the signal.

As described in more detail below, a validating device may validate a set of alphanumeric characters from an NFC signal without concurrent network communication. For example, the NFC signal may include a digital signature generated using a digital signature algorithm that generates the digital signature based on data derived from the credential and a private key of the credential grantor. The validating device may then access a public key of the credential grantor to validate the digital signature using the digital signature algorithm. Upon successful validation, the validating device may output a display providing information from the validated credential such as the user name, user title, and/or credential grantor associated with the credential.

Alternatively or in addition, the validating device may validate the NFC signal by transmitting a validation request message to a server. The validation request message may include data corresponding to the alphanumeric characters that were encoded in the NFC signal. When the server receives the validation request message, it attempts to confirm that the presented NFC signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential. Upon successful validation, the server sends the validating device a validation response indicating that the NFC signal was valid (e.g., the alphanumeric characters in the request match a valid sequence of alphanumeric characters for the credential). In turn, the validating device may then provide an indication that the representation presented by the user was valid.

In addition to validating the credential encoded within the NFC signal, the server also may validate the integrity of the data encoded within the NFC signal. For example, the NFC signal may include a time sensitive checksum to prevent misrepresentations of other users' credentials. In such cases, the alphanumeric characters encoded in the NFC signal include both the credential and the time sensitive checksum. The server can then validate the alphanumeric characters encoding the credential in the NFC signal using the time sensitive checksum, thereby safeguarding the data integrity of the user's credential.

FIG. 1 shows an example of a user interface 100 that enables a user to select from among various credentials that have been issued to the user. In some implementations, the various credentials may be issued by different organizations. In particular, the user interface 100 includes an example of a user's wallet (identified with a "User Wallet" caption 102) that provides the user with access to numerous different credentials associated with the user. For example, the user interface 100 includes a "Gym Membership Badge" 106 issued by Armstrong's Gym, and a "MicroStrategy Employee Badge" 108, a "MicroStrategy Headquarters 10$^{th}$ Floor Access Badge" 110, and a "MicroStrategy Headquarters Executive Suite Access Badge" 112 issued by MicroStrategy Incorporated. The user can select any one of these credentials from the user's wallet to output a representation of the credential from the user's client device. The user may make the selection, for example, by touching the corresponding area on a presence-sensitive display of the client device. The user can also select an Edit command button 104 to modify settings associated with the credentials, and can add a credential to the wallet by selecting command button 114.

FIG. 2 shows an example of a user interface 200 including an optical-machine readable representation of a credential configured for validation with concurrent network communication. When a user selects the "MicroStrategy Employee Badge" 108 shown in FIG. 1, the client device may select a representation of the selected credential that is configured for online or off-line validation (i.e., with or without concurrent network communication). For example, the client device may automatically select the representation of the credential configured for online validation. Alternatively or in addition, the user may select a default, property, or option at the client device that governs whether to provide a representation configured for online or off-line validation.

In this example, the client device selects the representation configured for online validation and displays the selected badge 200 as shown in FIG. 2. The badge 200 includes a caption 202 identifying it as an "Employee Badge" with the credential grantor being "MicroStrategy Incorporated." Also included is an image of the user 204 and a caption 206 that identifies the associated user as "John Smith, Chief Operating Officer." In some implementations, the client device may obtain the user's image from, for example, a memory of the client device or a server.

The badge 200 further includes a swiping slider 208 that may enable a user to select from among different representations for the credential. Additionally, a given representation for a credential may have two different versions—one version configured for online validation and another version configured for off-line validation. The off-line version may include a digital signature that was generated from a hash or checksum of information in the credential and a private key of the credential grantor as discussed below. In some implementations, the slider 208 may allow a user to select between online and off-line versions of a credential. For example, in the current position, the slider 208 causes an optical-machine readable representation for the credential 210 that is configured for online validation to be displayed.

While the information shown in sample badge 200 is limited to the name of the credential, credential grantor, user image, user name, and user title, implementations need not be so limited, and a credential may display more information than that illustrated in FIG. 2. For example, the credential may be rendered as a skeuomorph that replicates a physical badge having front and back surfaces, and the back surface of the credential may display, among other information, the user's email address, the user's phone number, the user's physical address, etc.

Figure 3:
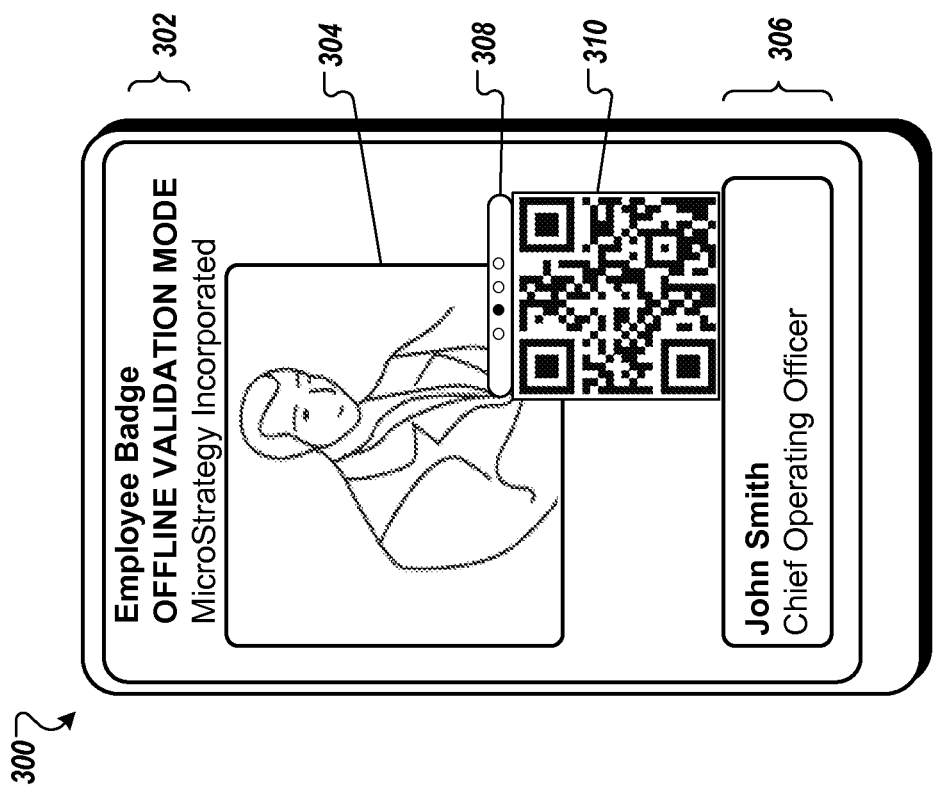
FIG. 3 is an illustration of an example of a user interface including an optical-machine readable representation of a credential configured for validation without concurrent network communication.

FIG. 3 shows an example of a user interface 300 including an optical-machine readable representation of a credential configured for validation without concurrent network communication. When a user selects the "MicroStrategy Employee Badge" 108 shown in FIG. 1, the client device may select a representation of the selected credential that is configured for online or off-line validation. In some implementations, the representation of the credential that is configured for off-line validation may be validated by using either an off-line validation process (e.g., by a validating device using a public key) or an on-line validation process (e.g., validation through a network connection to a server).

For example, the client device may select a representation of the credential configured for off-line validation. Alternatively or in addition, the user may select a default, property, or option at the client device that governs whether to provide a representation configured for online or off-line validation. In some implementations, for example, the client device may require substantially real-time information from the server to be able to output the version of the credential for on-line validation. Thus, if the client device lacks network connectivity, the client device may select the off-line representation of the credential because the real-time information needed for the on-line version is inaccessible.

In the example illustrated in FIG. 3, the client device selects the representation of the credential configured for off-line validation and displays the selected badge 300. The badge 300 includes a caption 302 identifying it as an "Employee Badge" configured for "OFF-LINE VALIDATION MODE" with the credential grantor being "MicroStrategy Incorporated." Also included is an image of the user 304 and a caption 306 that identifies the associated user as "John Smith, Chief Operating Officer."

The badge 300 further includes a swiping slider 308 that may enable a user to select from among different representations for the credential and different versions (i.e., online or off-line) for a given representation of the credential. For example, in the current position, the slider 308 causes an optical-machine readable representation for the credential 310 that is configured for off-line validation to be displayed.

FIG. 4 shows an example user interface 400 for validating an optical machine-readable representation for a credential. The user interface 400 may be displayed on a validating device and includes components that allow a validation entity to validate an optical machine-readable representation presented on the client device of another user. In particular, the user interface 400 includes a caption 408 instructing the user to "Scan the QR code on the client device. Keep the QR code steady on-screen, and allow the camera to focus." In an example operation, the validation entity orients a camera coupled to the validating device such that an optical machine-readable representation for a credential (e.g., a bar code or QR code) displayed on a user's client device is within a reticle 410 displayed on the validating device. The validating device scans and decodes the QR code (e.g., to obtain a set of alphanumeric characters) and then attempts to validate the credential. For example, the validating device may authenticate a digital signature encoded in the QR code.

The user interface 400 also enables a validation entity to select between an off-line validation mode for QR codes with command button 402 labeled "QR Code Off-line," and an online validation mode for QR codes with command button 404 labeled "QR Code." In some implementations, the validating device automatically determines whether it currently has network connectivity, and automatically selects the appropriate validation mode based on this determination. For example, the validating device may determine that it does not have network connectivity, and therefore automatically enter off-line validation mode. In such an example, a user of the validating device may request that a user of a client device present an representation of a credential that is configured for off-line validation, because the validating device does not have a network connection.

Additionally or alternatively, in some implementations, the validating device may determine whether to operate in the off-line validation mode or the on-line validation mode depending on the content of the QR code received by the validating device. For example, after receiving a QR code, the validating device may be able to determine whether the received QR code is configured for off-line or on-line validation based on the content of the received QR code. If the validating device determines that the received QR code is configured for off-line validation, the validation device may determine to operate in the off-line validation mode. Likewise, if the validating device determines that the received QR code is configured for on-line validation, the validation device may determine to operation in the on-line validation mode.

FIGS. 5A and 5B show example screens 500, 520 notifying a validation entity that a credential has been validated. In some implementations, upon successful validation in the off-line mode, the validating device decodes and displays information from the credential representation. For example, the validating device may substantially recreate the credential at the validating device using information encoded in the credential representation presented to the validating device.

FIG. 5A illustrates an example implementation in which limited bandwidth protocols are used to exchange the credential representation (e.g., singleton QR codes or sound signals). In such implementations, the recreated credential at the validating device may include a subset of information from the credential. In one example, the validating device may decode the user name, the user title, and the credential grantor identifier from the validated credential. The validating device may then output the decoded information to a display of the validating device as shown in FIG. 5A. The screen 500 includes a caption 502 identifying the successfully validated credential as an "Employee ID" with the credential grantor being "MicroStrategy Incorporated" (i.e., the credential grantor). Also included is a success notification 504 showing "Badge Validated!" The screen 500 further includes a caption 506 that identifies the user associated with the validated credential as "John Smith" (i.e., the user name) and the title associated with the validated credential as "Chief Operating Officer."

FIG. 5B illustrates an example implementation in which high bandwidth communication protocols are used to exchange the credential representation (e.g., an NFC signal) or where animated QR codes are used to exchange the credential representation. In such implementations, the recreated credential may include all, or substantially all of the information from the credential. For example, it may be possible to encode the photograph of the user (or a low resolution version of the photograph) within the credential representation. In such implementations, the validating device may output decoded information from the representation to a display of the validating device as shown in FIG. 5B. The screen 520 includes a caption 522 identifying the successfully validated credential as an "Employee ID" with the credential grantor being "MicroStrategy Incorporated" (i.e., the credential grantor). The screen 520 also includes a photograph of the user 524. Also included is a success notification 528 showing "Badge Validated!" The screen 500 further includes a caption 526 that identifies the user associated with the validated credential as "John Smith" (i.e., the user name) and the title associated with the validated credential as "Chief Operating Officer."

Figure 6:
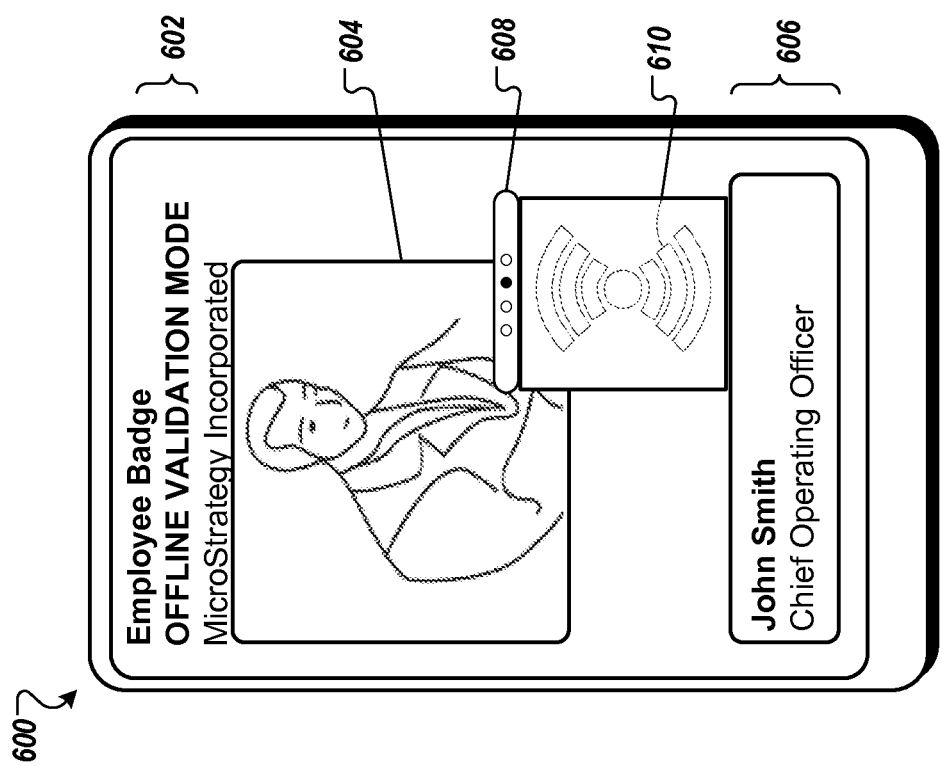
FIG. 6 is an illustration of an example user interface on a client device that provides a sound signal or near-field communication signal representing a credential configured for validation without concurrent network communication.

FIG. 6 shows an example user interface 600 on a client device that provides a sound signal or NFC signal representing a credential configured for validation without concurrent network communication. As discussed above, when a user selects the "MicroStrategy Employee Badge" 108 shown in FIG. 1, the client device may select a representation of the credential that is configured for online or off-line validation. For example, the client device may determine that it currently does not have network connectivity and, as a result, select the representation configured for off-line validation. Alternatively or in addition, the user may select a default, property, or option at the client device that governs whether to provide a representation of the credential that is configured for online or off-line validation. In this example, the client device selects the representation of the credential that is configured for off-line validation and displays the selected badge 600 as shown in FIG. 6. The badge 600 includes a caption 602 identifying it as an "Employee Badge" configured for "OFF-LINE VALIDATION MODE" with the credential grantor being "MicroStrategy Incorporated." Also included is an image of the user 604 and a caption 606 that identifies the associated user as "John Smith, Chief Operating Officer."

The badge 600 further includes a swiping slider 608 that may enable a user to select from among different representations for the credential and different versions (e.g., online or off-line) for a given representation of the credential. For example, in the current position, the slider 608 causes the client device to output a signal (e.g., a sound signal or NFC signal) representing the credential that is configured for off-line validation. While the signal is being output by the client device, the client device may also display a graphical indicator 610.

Figure 7:
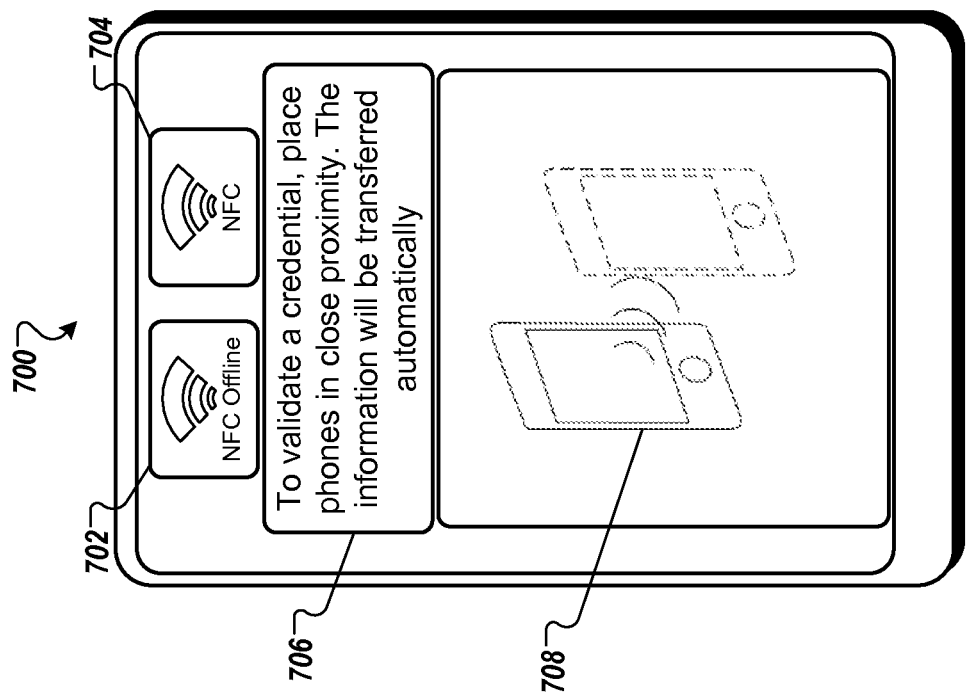
FIG. 7 is an illustration of an example user interface for validating a sound signal or near-field communication signal representing a credential.

FIG. 7 shows an example user interface 700 for validating a signal (e.g., a sound signal or NFC signal) representing a credential. The example user interface 700 enables a validation entity to use a validating device to validate a signal representing a credential presented by a user. The user interface 700 may enable a validation entity to select between an off-line validation mode for a signal (e.g., an NFC signal) with command button 702 labeled "NFC Off-line", and an online validation mode for a signal with command button 704 labeled "NFC." In some implementations, the validating device automatically determines whether it currently has network connectivity, and selects the appropriate validation mode based on this determination. For example, the validating device may determine that it does not have network connectivity, and therefore automatically enter off-line validation mode.

Additionally or alternatively, in some implementations, the validating device may determine whether to operate in the off-line validation mode or the on-line validation mode depending on the content of the signal received by the validating device. For example, after receiving a signal, the validating device may be able to determine whether the received signal is configured for off-line or on-line validation based on the content of the received signal. If the validating device determines that the received signal is configured for off-line validation, the validation device may determine to operate in the off-line validation mode. Likewise, if the validating device determines that the received signal is configured for on-line validation, the validation device may determine to operation in the on-line validation mode.

Selection of the command button 702 may cause the validation device to receive a signal (e.g. a sound signal or an NFC signal) generated at a client device of a user, where the signal encodes a representation for the user's credential (e.g., an alphanumeric code representing the user's credential). The validation device may provide a graphical indication 710 as shown in FIG. 7 that the signal is being received.

The user interface 700 includes several additional components to facilitate validation. In particular, the user interface 700 includes a caption 708 instructing the user as follows: "To validate a credential, place phones in close proximity. The information will be transferred automatically." When validating a sound signal, a validation entity then places a microphone coupled to the validation device such that a sound signal being output by a speaker of the user's client device can be received. When validating an NFC signal, a validation entity places a wireless transmitter coupled to the validating device such that an NFC signal being output by a wireless transmitter of the user's client device can be received. For example, the validation entity may bump the validating device against the user's client device or bring the validating device into close proximity with the user's client device. The validation device displays a graphical indication 710 that the validation device is ready to receive the signal. The validation device receives and decodes the signal to obtain a set of alphanumeric characters. As discussed below, the validation device then attempts to validate the credential (e.g., by authenticating a digital signature included in the signal).

Figure 8:
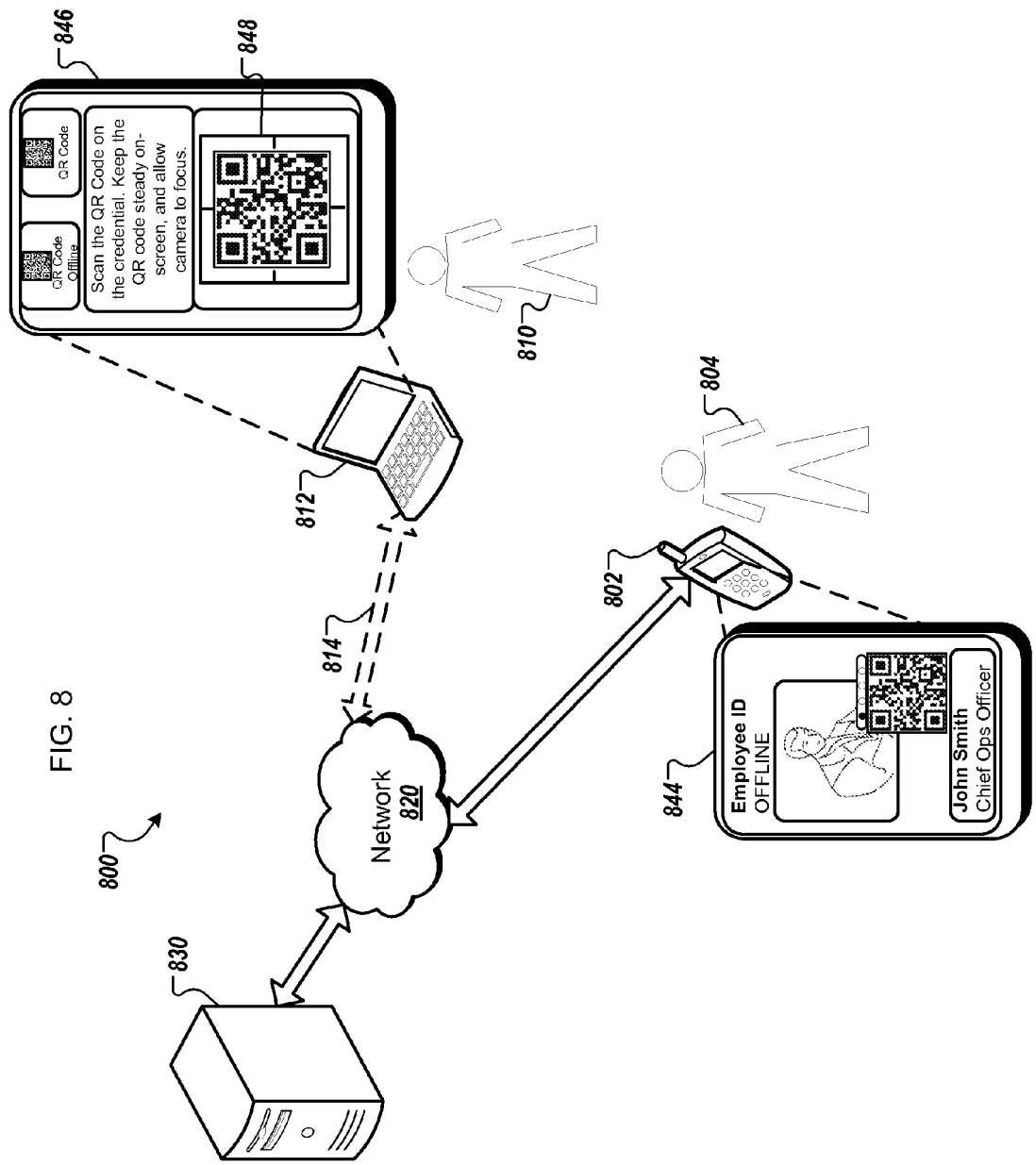
FIG. 8 is a diagram of an example system for management, distribution, and validation of user credentials.

FIG. 8 shows an example system for 800 management, distribution, and validation of user credentials. As an overview, a server 830 communicates via a network 820 with a client device 802 operated by a user 804 and a processing system 812 operated by a validation entity 810. When the client device 802 outputs a representation for a credential (e.g., a QR code) on the screen 844 of the client device 802, the validation entity 810 operates the processing system 812 to validate the credential. As part of validating the user's credential, the processing system 812 displays a validation screen 846.

The components of the system 800 will now be described in more detail.

The server 830 manages and/or stores one or more credentials, associates users and groups of users with appropriate credentials, and provides the credentials to users' client devices and/or processing systems (e.g., operated by validation entities) for validation. The server 830 can be any suitable computer or collection of computers executing software capable of managing, distributing, and/or validating representations of credentials for users and groups of users via a network 820 as described herein.

Credentials, user accounts, group accounts, and administrative accounts can be stored in a database (e.g., MySQL, PostgreSQL, MS SQL Server, MongoDB), or other suitable data structure that can be accessed by the server 830. In some implementations, the server 830 may access the stored credentials and/or user accounts via web services such as representational state transfer (REST) style services.

The server 830 can create a credential based on input provided by a credential grantor (e.g., an employer) or receive a credential from a credential grantor. In some implementations, multiple different credential grantors (e.g., different entities and/or organizations) may issue credentials using the same server 830. The credential may include a variety of information such as a credential identifier (e.g., a number or alphanumeric character string that uniquely identifies a credential), an indication of the grantor of the credential, information about the user to whom the credential grantor granted the credential (e.g., user name and user title, a photograph, etc.), an indication of one or more permissions granted by the credential grantor to the user, and/or a description of an event or location associated with the credential.

In some implementations, the server 830 may present an interface to a credential grantor for creation of credentials. For example, the server 830 may present a web interface through which credential grantors can interact via a Web browser. In other aspects, the server 830 may be directly accessible via a graphical-user interface or an application running on a mobile device. Any suitable interface can be used that enables the creation and storage of credentials, and user accounts. In addition (or as an alternative) to creation of credentials by credential grantors, credentials may be created at the request of registered users through a web-based or other interface, or through any other suitable mechanism such as sending email or short message service (SMS) transmissions to grantors. In some implementations, registered users may be able to create credentials by use of an application running on a client device.

The server 830 also may present an interface so that users and/or credential grantors can create user accounts for individual users and groups of users. For example, the server 830 may present a web interface through which credential grantors can interact via a Web browser. Additionally or alternatively, the server 830 may be directly accessible via a graphical-user interface or an application on a mobile device. User accounts may be stored in a table or collection of tables in a database, or in any other suitable data structure accessible by the server 830. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device.

As an example, Mr. John Smith may request a new user account from the server 830 using an application executing on his client device. The server 830 can then create database entries representing a user account for Mr. Smith. A credential grantor could then create a row in another table for a group identified as employees of Company X. The grantor and/or server 830 could then link the database entry for Mr. Smith to the group account for Company X through use of a linking table.

Once credentials and users, or groups of users, have been created, credential grantors and/or users can associate the credentials with users, or groups of users. For example, the server 830 may present a web interface through which credential grantors can interact via a Web browser to link a given credential to a given user or group of users. In other aspects, the server 830 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 830 also may notify the users that they have been associated with the credential(s), for example by pushing notifications to the respective users' client devices. Such notifications may include the credential identifier for the user.

After a credential has been created and associated with a user, the server 830 may generate a version of a representation for the credential that can be validated without concurrent network communication (i.e., an off-line version). The off-line version may be an optical machine-readable representation for the credential, a sound signal representing the credential, or an NFC signal representing the credential. To create the off-line version, the server 830 encodes a portion (or all) of the information associated with a credential into a representation. In one example, the server 830 may encode a user's name and title, and information identifying the corresponding credential grantor within a QR code. In another example, the server 830 may encode a user's name and title, information identifying the corresponding credential grantor, and a photograph of the user within a QR code, an animated QR code, or a sound or NFC signal. The server 830 also uses a private key of the corresponding credential grantor to generate a digital signature using the information encoded in the off-line version, and encodes the digital signature into the representation.

As described herein, a key may be a private key or public key that can be used with a digital signature scheme. A digital signature scheme is a technique for validating the authenticity of a credential so as to assure a validation entity that the credential was created by the credential grantor identified in the credential and/or that the credential was not altered.

A digital signature scheme may include three algorithms—a key generation algorithm, a signing algorithm, and a signature authentication algorithm. A key generation algorithm is used to select a private key from a set of possible private keys. The key generation algorithm then outputs the selected private key and a corresponding public key. These public and private keys may include integers of any suitable length such as, for example, 80 bits, 128 bits, 256 bits, 512 bits, or 1024 bits. The key generation algorithm may use any suitable algorithm such as, for example, the Rivest, Shamir, Adleman (RSA) algorithm, the digital signature algorithm (DSA), or any derivatives of these algorithms.

In operation, the public and private keys may be generated at the server 830 on behalf of credential grantors or they may be generated by the credential grantors themselves. The public keys may then be provided to the processing system 812. For example, the public keys may be published to a directory that is accessible to the processing system 812, the processing system 812 may have public keys pre-installed, the processing system may receive public keys when a validation entity 810 first runs a credential management application on the processing system 812 and creates a user account associated with the application, or the processing system 812 may receive public keys when a validation entity logs into the application from the client device. In some implementations, the processing system 812 may periodically receive public keys of credential grantors, for example from the server 830 or another server.

In cases where the credential grantors generate the private keys, the server 830 may obtain private keys from credential grantors and hold them in escrow for the purpose of creating off-line versions of representations for credentials. For example, a credential grantor desiring to enable off-line validation of their credentials could securely transmit private keys to the server 830 (e.g., by using a Diffie-Hellman key exchange), which could then store the private keys in an encrypted memory or storage device.

A signing algorithm generates a digital signature given a message (e.g., data associated with a credential) and a private key. For example, the server 830 may produce a hash value of the portion of the data associated with the credential that is encoded within the representation of the credential (e.g., the user name, user title, and credential grantor identifier) using any suitable hashing technique such as the message digest algorithm (MD5), secure hash algorithm (SHA-1), or SHA-2. The server 830 then computes the digital signature from the hash value using the appropriate algorithm. For example, using the RSA algorithm, the server 830 would raise the hash value to the power of d (modulo n), where d and n are included in the private key. The server 830 then adds the digital signature to the off-line version of the representation for the credential.

A signature authentication algorithm verifies that a digital signature is authentic given a message and a public key. For example, when the client device 802 provides a representation for a credential, the processing system 812 receives and decodes the representation for a credential. The processing system 812 may then determine that the representation includes a digital signature. In some implementations, the set of alphanumeric characters that are decoded from the representation may include a number of fields, including a user name, a user title, a credential grantor identifier, and a digital signature. In some implementations, the fields may include a version identifier of a public key to accommodate credential grantors that may have multiple public keys. The set of alphanumeric characters may be, for example, a JavaScript Object Notation (JSON) data structure or an eXtensible Markup Language (XML) data structure. An example set of alphanumeric characters for an employee badge issued to "John Smith, Chief Operations Officer" by "MicroStrategy Incorporated" formatted in JSON is shown below:

"employee_badge": {
"user_name": "John Smith",
"title": "Chief Operations Officer",
"credential_grantor": "MicroStrategy Incorporated",
"signature": 65930904,
"version_id": 2}

Using the credential grantor identifier as an index, the processing system 812 can access the appropriate public key for the credential grantor from a local memory or storage device. The processing system 812 then uses the same digital signature used by the server 830 to authenticate the digital signature. For example, using the RSA algorithm, the processing system 812 would raise the digital signature (which is an integer as discussed above) to the power of e (modulo n), where e and n are included in the public key. The processing system 812 then generates a hash value from a portion of the data associated with the credential encoded within the representation of the credential (e.g., the user name, user title, and credential grantor identifier) using any suitable hashing technique such as MD5, SHA-1, or SHA-2. It should be noted that both the hashing technique and data used by the server 830 and the processing system 812 should match to successfully authenticate a digital signature. The processing system 812 then compares the value generated from the digital signature and the hash value. If they match, the processing system 812 determines that the digital signature was authentic (i.e., that the credential grantor signed the credential and that the credential has not been altered since the credential grantor signed the credential). The process of generating and validating digital signatures is described in more detail in publications such as National Institute of Standards and Technology, (July 2013), *Federal Information Processing Standards Publication: Digital Signature Standard (DSS)* (FIPS PUB 186-4).

Once credentials have been associated with appropriate user and/or group accounts, the credentials can then be distributed to client devices for the appropriate users via the network 820. In particular, when the server 830 has generated off-line versions of a representation for a credential, the server 830 may provide the off-line version to the appropriate client devices over the network 820. In some implementations, the server 830 may provide the online version to the appropriate client devices over the network 820 as well. The network 820 may be a local area network ("LAN") and/or a wide area network ("WAN"), e.g., the Internet. In some implementations, the server 830 may communicate with the client devices via SMS or multimedia messaging service (MMS). The server 830 may access user accounts in a database to locate the appropriate users' client devices.

In some implementations, the processing system 812 may periodically download a revoked credential list from the server 830 and store the list in a local memory or storage device. For example, the processing system 812 may download a revoked credential list daily, weekly, or monthly when network access is available. When the processing system 812 validates a credential in the off-line mode, the processing system 812 can verify that the credential is not listed in the revoked credential list, and therefore confirm that the credential has not been revoked. Advantageously, such a process may reduce the likelihood that a user may rely upon a revoked credential for validation in the off-line mode.

In some implementations, a credential grantor may send a message to the server 830 to revoke a credential. The server 830 may then transmit a command to the appropriate client devices that requires deletion of the credential. For example, the server 830 may push an alert to the user's client device 802. In response to this alert, the client device 802 may delete the off-line version of the revoked credential from the client device.

In some implementations, off-line versions of credentials may expire after a predetermined period of time. For example, the client device 802 may automatically delete off-line versions of credentials from memory after a week, two weeks, a month, or any other suitable time period.

Client device 802 can receive the credentials associated with user 804, including any off-line versions of representations for credentials, and store them in any suitable memory for later retrieval. A given user 804 may be associated with multiple different credentials, and some or all of the credentials associated with a user 804 may be accessible on a user's client device 802. In particular, a software application executing on the client device 802 can retrieve the credentials associated with user 804 so they can be used for generating and presenting a representation of the credential (e.g., to a validation entity for validation). In some implementations, the client device 802 can also operate as a validating device. The client device 802 may be any type of computing device capable of executing a credential management software application, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

When a user 804 desires to present a representation of a credential to a validation entity for validation, the user 804 may input a command into the client device 802 via a man-machine interface (e.g., a user interface on a presence-sensitive display). The client device 804 may then select a representation configured for online or off-line validation (i.e., with or without concurrent network communication, respectively). For example, the client device 804 may determine that it currently has network connectivity and, as a result, automatically select and output the representation configured for online validation. On the other hand, the client device 804 may determine that it currently does not have network connectivity and, as a result, automatically select and output the representation configured for off-line validation. Alternatively or in addition, the user may select a default, property, or option at the client device 804 that governs whether to provide a representation configured for online or off-line validation.

In one example, the client device 802 may output a QR code to a display of the client device 802. The validation entity 810 may then use an optical scanner or camera coupled to the processing system 812 to scan the QR code displayed on the client device 802. The processing system 812 then decodes the QR code and uses the public key of the credential grantor that issued the credential to verify that a digital signature encoded within the QR code was signed using the private key of the credential grantor. As described above, the processing system 812 may maintain a repository of public keys for all credential grantors that issue credentials via the credential management server 830 (or for some relevant subset of the credential grantors that issue credentials using the credential management server 830).

As a result of verifying that the digital signature encoded within the QR code was signed using the private key of the credential grantor, the processing system 812 determines that the credential was issued by the credential grantor and, consequently, that the credential is valid. In response to this determination, the processing system 812 may use information decoded from the scanned QR code to display the credential (or a portion of the credential), thereby indicating to the validation entity 810 that the user's credential was valid. For example, the processing system 812 may display the user name, user title, and credential grantor identifier. Due to data size restrictions in the QR code specification, implementations involving the QR code may not readily encode a photograph of the user within a single QR code. However, in implementations involving an NFC signal representing the credential or an animated QR code representing the credential, a photograph or depiction of the user may also be encoded within the NFC signal and may be included within the digital signature.

While shown in FIG. 8 as a person, the validation entity 810 can be any agent capable of validating representations of credentials presented by users, and the processing system 812 can be any suitable computer or set of computers, such as a mobile phone, smart phone, PDA, tablet computer, laptop or desktop computer, or other stationary or portable device, that includes one or more processors and non-transitory computer readable media. For example, the validation entity 810 could be another user, and the processing system 812 could be another client device. As another example, the validation entity 810 could be a software application executing on the processing system 812 that processes a representation for a credential received from a client device 802, decodes the representation to generate an alphanumeric set of characters, and authenticates a digital signature included within the representation using a public key of a credential grantor to determine whether the representation is valid. The software application could then control a door lock and/or an automated gate to permit user 804 to enter.

In some implementations, the processing system 812 may maintain a log of off-line validations. For example, when the processing system 812 determines that it has lost network connectivity, it may commence recoding all off-line validations. Each time an off-line version of the representation is validated, the processing system 812 may then store information recording the transaction in a database or log file. The database or log file may include information about the validation transaction such as the date, time, location, user's identity, user's title, and/or any combination thereof. Then, when the processing system 812 regains network connectivity, information about the credentials that the processing system 812 validated while off-line may be reported to the server 830. For example, this may enable the server 830: (i) to track usage of credentials, (ii) to inform the processing system 812 of any credentials that were validated in the off-line mode that may have previously been revoked by the credential grantor, and/or (iii) to cause the off-line version of any credential that the processing system 812 validated to be deleted and replaced at the client devices from which they were presented.

Figure 9:
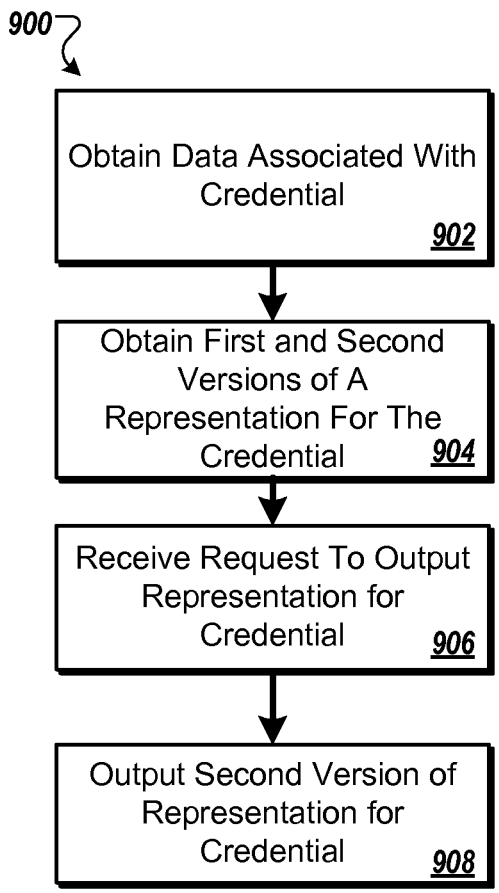
FIG. 9 is a flowchart of an example process for outputting a user credential for validation without concurrent network communication.

FIG. 9 shows an example process 900 for outputting a user credential for validation without concurrent network communication. The process 900 may be performed, for example, by the client device 802 of FIG. 8. In step 902, a client device obtains data associated with the credential. The data may be, for example, a credential identifier, a user identifier, a user name, a photograph, a credential grantor identifier, a badge type, a user email address, a user phone number, and a user physical address. In some implementations, the data may include a version identifier of the public key associated with the credential grantor.

Then, in step 904, the client device obtains a first version of a representation for the credential and a second version of the representation for the credential. The first version is configured for validation by a validation entity via concurrent network communication. The second version is configured for validation by a validation entity without concurrent network communication. In addition, the second version of the credential includes a digital signature derived from a private key of a credential grantor and a portion of the data associated with the credential. The representation for the credential may be, for example, an optical machine-readable representation, a sound signal, or an NFC signal. In some implementations, the digital signature may have been encoded using the RSA algorithm, or the DSA algorithm.

In one example, the second version of the representation for the credential may include a user name, user title, and a credential grantor identifier, in addition to the digital signature. In particular, the client device may display the user name, user title, and credential grantor identifier while the client device outputs the representation for the credential.

Next, in step 906, the client device receives a request to output a representation for the credential. For example, a user may select a representation for the credential via a graphical user interface. In some implementations, the client device automatically detects whether it has network connectivity, and automatically selects the version of the representation for the credential that permits validation without concurrent network communication. Alternatively or in addition, the user may specifically select the version of the representation for the credential that permits validation without concurrent network communication.

Finally, in step 908, the client device outputs the second version of the representation for the credential so that a validation entity may validate the credential by accessing a public key of the credential grantor to authenticate the digital signature. When the data associated with the credential includes a version identifier of the public key, the validation entity may determine which version of the public key to access using the version identifier. Where the digital signature was encoded using the RSA algorithm, the validation entity likewise uses the RSA algorithm to authenticate the digital signature. Similarly, where the digital signature was encoded using the DSA algorithm, the validation entity uses the DSA algorithm to authenticate the digital signature.

In some implementations, upon validating the credential, the validation entity outputs data associated with the credential to a display of the validation entity. For example, the validation entity may re-create a display that is substantially similar to the display that was rendered on the client device during output of the representation for the credential. This re-created display may include, for example, a user name, user title, and credential grantor identifier.

In some implementations, the second version of the representation (i.e., the version configured for validation without concurrent network communication) may expire after a predetermined period of time. For example, the client device may delete the second version of the representation after a week, two weeks, a month, or any other suitable time period. Alternatively or in addition, a server may transmit a command to the client device requiring deletion of the second version of the representation. In particular, the server may transmit a notification that the second version of the representation has been revoked. In response to the notification, the client device deletes the second version of the representation for the credential.

Figure 10:
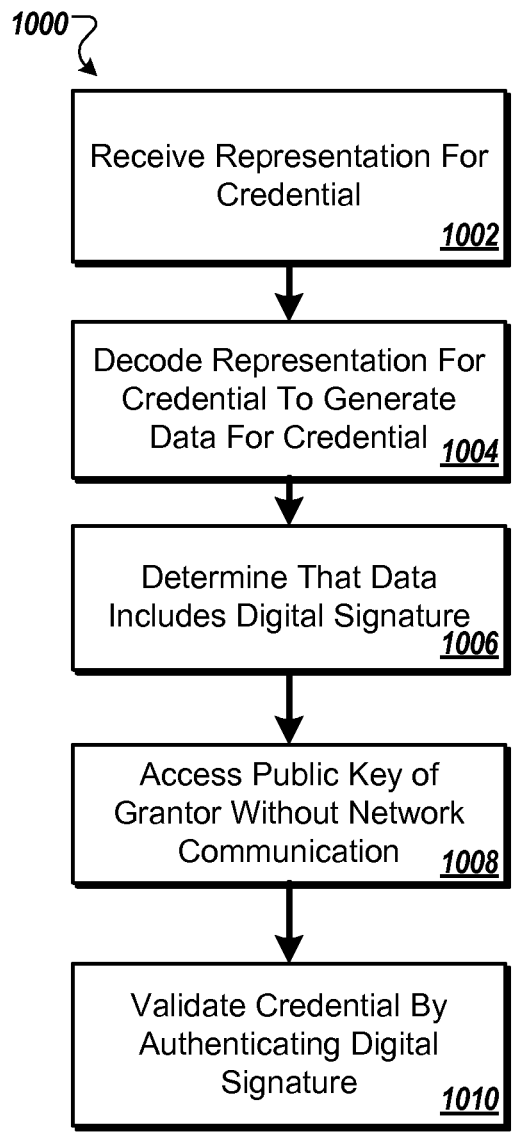
FIG. 10 is a flowchart of an example process for validating a user credential without concurrent network communication.

FIG. 10 shows an example process 1000 for validating a user credential without concurrent network communication. The process 1000 may be performed, for example, by the processing system 812 of FIG. 8.

In step 1002, a processing system receives a representation for a credential from a client device. The processing system then decodes the representation to generate data associated with the credential in step 1004. The data may include one or more of a credential identifier, a user identifier, a user name, a photograph, a credential grantor identifier, a badge type, a user email address, a user phone number, and a user physical address encoded within the received representation for the credential. In some implementations, the data may also include a version identifier of a public key.

Then, in step 1006, the processing system determines that the data associated with the credential includes a digital signature that was derived from a private key of a credential grantor and a portion of the data associated with the credential. The digital signature may have been generated using any suitable digital signature algorithm such as, for example, the RSA algorithm or the DSA algorithm.

In step 1008, the processing system accesses a public key of the credential grantor without concurrent network communication. For example, the public key may have been stored in a memory or storage device locally accessible to the processing system prior to receiving the representation of the credential from the client device and the processing system may retrieve the public key from the memory or storage device locally accessible to the processing system after receiving the representation of the credential from the client device. When the data decoded from the representation of the credential includes a version identifier of a public key, the processing system accesses the appropriate version of the public key (potentially from among multiple different versions of the public key) based on the version identifier.

Finally, in step 1010, the processing system validates the credential by authenticating the digital signature using the public key of the credential grantor and the portion of the data associated with the credential encoded within the representation of the credential received from the client device. For example, the processing system may authenticate the digital signature using the RSA algorithm or the DSA algorithm.

In some implementations, the processing system receives data identifying a set of credentials that have been revoked. For example, the server may periodically transmit a revocation list that identifies particular credentials to the processing system. The processing system may then compare a credential presented by the client device with the credentials in the revocation list. Based on this comparison, the processing system may determine whether a given credential has been revoked.

Some implementations may involve the processing system determining that it lacks network connectivity. In response, the processing system may store information identifying any validated credentials in a memory or storage device for the period during which it lacks network connectivity. Upon regaining network connectivity, the processing system may communicate information identifying any validated credentials (i.e., the information identifying validated credentials stored in the memory or storage device) to a server.

In some implementations, in response to validating the credential, the processing system outputs a display of the credential that includes the user name, the user title, and the credential grantor identifier, which were decoded from the representation. This display at the processing system may be substantially similar to a display of the credential at the client device from which the representation of the credential was received.

While the processes illustrated in FIGS. 9 and 10 are described separately, in some implementations, a single client device may have the ability to both present off-line representations of credentials for validation and to validate off-line representations of credentials.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A non-transitory computer-readable medium storing instructions executable by one or more processors which, upon such execution, cause the one or more processors to perform operations comprising:
   obtaining, at a client device, data associated with a credential;
   identifying, at the client device, an option to provide a first version of a representation for the credential and an option to provide a second version of the representation for the credential, the first version requiring concurrent network communication between the client device and a credential server for presentation of the first version to a validation entity, and the second version being configured for presentation by the client device to a validation entity without concurrent network communication between the client device and the credential server, wherein the second version of the credential comprises a digital signature derived from a private key of a credential grantor and a portion of the data associated with the credential, and wherein each of the first and second version of the credential can be independently validated;
   receiving, at the client device, a request to output a representation for the credential;
   selecting, at the client device and based on whether the client device currently has network connectivity to communicate with the credential server, the first version of the representation for the credential or the second version of the representation for the credential to be outputted by the client device;
   determining, at the client device, that the client device lacks network connectivity with the credential server; and
   in response to determining that the client device lacks network connectivity with the credential server, automatically outputting, by the client device, the representation for the second version of the credential for validation by a validation entity, wherein the digital signature of the representation of the second version of the credential is configured to be authenticated using a public key of the credential grantor.

2. The computer-readable medium of claim 1, wherein obtaining, at a client device, data associated with a credential comprises obtaining, at the client device, one or more of a credential identifier, a user identifier, a user name, a credential grantor identifier, a badge type, a user email address, a user phone number, and a user physical address.

3. The computer-readable medium of claim 1,
   wherein obtaining, at a client device, data associated with a credential comprises obtaining, at the client device, a version identifier of the public key; and
   wherein outputting, by the client device, the selected version of the representation for the credential for validation by a validation entity comprises outputting, by the client device, the representation for the second version of the credential for validation by a validation entity to validate the credential by accessing a public key of the credential grantor based on the version identifier to authenticate the digital signature.

4. The computer-readable medium of claim 1,
   wherein the first version of the representation of the credential comprises a first machine readable representation for the credential and the second version of the representation of the credential comprises a second machine readable representation for the credential;
   wherein receiving, at the client device, a request to output a representation for the credential comprises receiving, at the client device, a request to output an optical machine-readable representation; and
   outputting, by the client device, the selected version of the representation for the credential for validation by a validation entity comprises outputting, to a display of the client device, the second optical machine-readable representation.

5. The computer-readable medium of claim 1,
   wherein the first version of the representation of the credential comprises a first quick response (QR) code representing the credential and the second version of the representation of the credential comprises a second QR code representing the credential;
   wherein receiving, at the client device, a request to output a representation for the credential comprises receiving, at the client device, a request to output a QR code; and
   outputting, by the client device, the selected version of the representation for the credential for validation by a validation entity comprises outputting, to a display of the client device, the second QR code representing the credential.

6. The computer-readable medium of claim 1,
   wherein the first version of the representation of the credential comprises a first optical machine-readable representation for the credential and the second version of the representation of the credential comprises a sequence of optical-machine readable representations for the credential;
   wherein receiving, at the client device, a request to output a representation for the credential comprises receiving, at the client device, a request to output an optical machine-readable representation; and
   outputting, by the client device, the selected version of the representation for the credential for validation by a validation entity comprises outputting, to a display of the client device, the sequence of optical machine-readable representations.

7. The computer-readable medium of claim 1,
   wherein the first version of the representation of the credential comprises a first near-field communications (NFC) signal representing the credential and the second version of the representation of the credential comprises a second NFC signal representing the credential;
   wherein receiving, at the client device, a request to output a representation for the credential comprises receiving, at the client device, a request to output an NFC signal representing the credential; and
   outputting, by the client device, the selected version of the representation for the credential for validation by a validation entity comprises outputting, the second NFC signal.

8. The computer-readable medium of claim 1,
   wherein the second version of the credential comprises a digital signature derived using (i) a Rivest Shamir Adleman (RSA) algorithm or a digital signature algorithm (DSA), (ii) a private key of a credential grantor, (iii) and a portion of the data associated with the credential.

9. The computer-readable medium of claim 1, wherein the operations further comprise deleting the second version of the representation for the credential after a predetermined period of time.

10. The computer-readable medium of claim 1, wherein the operations further comprise:
receiving, at the client device, a notification that the second version of the representation for the credential has been revoked; and
in response to the notification, deleting the second version of the representation for the credential.

11. The computer-readable medium of claim 1, wherein the second version of the credential comprises a user name, a user title, a credential grantor identifier, and a digital signature derived from a private key of a credential grantor and a portion of the data associated with the credential.

12. A non-transitory computer-readable medium storing instructions executable by one or more processors which, upon such execution, cause the one or more processors to perform operations comprising:
determining, at a processing system associated with a validation entity, that the processing system lacks network connectivity with a validation server;
in response to determining that the processing system lacks network connectivity with the validation server, requesting, for validation at the processing system, representations of credentials that are configured for validation without concurrent network connectivity between the processing system and the validation server;
receiving, at the processing system, a representation for a credential from a client device;
decoding, at the processing system, the representation to generate data associated with the credential, the generated data comprising a digital signature derived from a private key of a credential grantor and other data associated with the credential;
determining, at the processing system, that the representation of the credential is configured for validation without concurrent network connectivity based on the digital signature;
in response to determining that the representation of the credential is configured for validation without concurrent network connectivity, accessing, at the processing system and without concurrent network communication with the validation server, a public key of the credential grantor; and
validating, at the processing system, the credential by authenticating the digital signature using the public key of the credential grantor and the other data associated with the credential.

13. The computer-readable medium of claim 12, wherein the operations further comprise:
receiving, at the processing system, data identifying a set of credentials that have been revoked;
comparing, at the processing system, the credential to each credential in the set of credentials that have been revoked; and
based on the comparison, determining, at the processing system, that the credential has not been revoked.

14. The computer-readable medium of claim 12, wherein the operations further comprise:
determining, at the processing system, that the processing system lacks network connectivity with the validation server;
storing, at the processing system, information identifying the validated credential as a consequence of having determined that the processing system lacks network connectivity; and
after determining that network connectivity has been regained, communicating, to the validation server, the information identifying the validated credential.

15. The computer-readable medium of claim 12, wherein decoding, at the processing system, the representation to generate data associated with the credential comprises decoding, at the processing system, the representation to obtain one or more of a credential identifier, a user identifier, a user name, a credential grantor identifier, a badge type, a user email address, a user phone number, and a user physical address.

16. The computer-readable medium of claim 12, wherein decoding, at the processing system, the representation to generate data associated with the credential comprises decoding, at the processing system, the representation to obtain a user name, a user title, and a credential grantor identifier; and
wherein the operations further comprise, in response to validating the credential, outputting, at the processing system, a display of the credential having the user name, the user title, and the credential grantor identifier.

17. The computer-readable medium of claim 12,
wherein decoding, at the processing system, the representation to generate data associated with the credential comprises decoding, at the processing system, the representation to obtain a version identifier of the public key; and
wherein accessing, at the processing system and without concurrent network communication, a public key of the credential grantor comprises accessing, at the processing system and without concurrent network communication, a public key of the credential grantor based on the version identifier.

18. The computer-readable medium of claim 12,
wherein determining, at the processing system, that the representation of the credential is configured for validation without concurrent network connectivity based on the digital signature comprises determining, at the processing system, that the digital signature is derived using (i) a Rivest Shamir Adleman (RSA) algorithm or a digital signature algorithm (DSA), (ii) a private key of a credential grantor, (iii) and a portion of the data associated with the credential;
wherein validating, at the processing system, the credential by authenticating the digital signature using the public key of the credential grantor and the other data associated with the credential comprises validating, at the processing system, the credential by using the RSA algorithm or the DSA with the public key of the credential grantor and the other data associated with the credential to authenticate the digital signature.

19. A non-transitory computer-readable medium storing instructions executable by one or more processors which, upon such execution, cause the one or more processors to perform operations comprising:
obtaining, at a client device, data associated with a credential;
identifying, at the client device, an option to provide a first version of a representation for the credential and an option to provide a second version of the representation for the credential, the first version requiring concurrent network communication by a validation entity with a validation server for validation of the credential, and the second version being configured for validation by a validation entity without concurrent network communication between the validation entity and the validation server, wherein the second version of the credential comprises a digital signature derived from a private key of a credential grantor and a portion of the data associated with the credential, and wherein each of the first and second version of the credential can be independently validated;

receiving, at the client device from a validation device, a request to output a representation of the credential that does not require concurrent network communication with the validation server for validation;

determining, at the client device, that the client device lacks network connectivity with the credential server;

in response to determining that the client device lacks network connectivity with the credential server, automatically selecting, at the client device and based on the request, the second version of the representation for the credential to be outputted by the client device, wherein the digital signature of the representation of the second version of the credential is configured to be authenticated using a public key of the credential grantor; and outputting, by the client device, the second version of the representation for the credential for validation by the validation device.

* * * * *